United States Patent Office 3,284,385
Patented Nov. 8, 1966

3,284,385
UNSATURATED ADDITION POLYMERS CONVERTIBLE BY OXYGEN TO INSOLUBLE POLYMERS
Gaetano F. D'Alelio, South Bend, Ind., assignor, by direct and mesne assignments, to Dal Mon Research Co., Cleveland, Ohio, a corporation of Delaware
No Drawing. Filed July 2, 1962, Ser. No. 207,012
20 Claims. (Cl. 260—23)

This invention relates to novel monomeric and polymeric compositions particularly suited for coating and related applications. More specifically, this invention relates to polymeric compositions which are fusible and/or soluble and which, on exposure to oxygen, oxygen-containing gases, or other forms of free or liberated oxygen, become converted to insoluble polymers.

The new polymers are classified as air-drying or air-convertible polymers by an analogy to the natural and synthetic drying and semi-drying oils, the unsaturated fatty acid modified alkyd resins, etc., which are considered as possessing air-drying properties. In the coating and related arts, the terms air-drying or air-convertibility do not refer to the physically dry state which results from the evaporation of a solvent as in a lacquer or from a coating composition such as a varnish, enamel or paint, but to the formation of an insoluble polymer resulting from the reaction of oxygen in the air with the oils or resins containing a multiplicity of unsaturated groups in their structures.

To be suitable as coating compositions, this air-convertibility should occur at ordinary temperatures such as between 70–120° F. although the rate will be much slower at lower temperatures and accelerated at high temperatures. In some cases, it is desirable to accelerate the conversion at temperatures as high as 212° F. or even 260° F. This conversion can be accelerated, at or ordinary or at higher temperatures by the addition of catalytic quantities of metal salts, known in the coating arts as driers, such as cobalt, manganese and lead salts of the fatty acids, linoleic acid, naphthenic acids, resins, etc., as are well known and commonly used in this art.

It is, then, an objet of this invention, to prepare polymeric compositions which are air-convertible at, at least, ordinary temperatures. It is also another object of this invention to prepare air-convertible polymeric compositions in which the convertibility is accelerated by metallic driers.

The objectives of this invention are achieved, at least in part, by polymerizing acrylic esters of the general formula $$CH_2=\overset{R'}{\underset{|}{C}}-COOY-OOCR_d$$

wherein R' represents H and CH$_3$, R$_d$COO— represents the radical of unsaturated fatty acids possessing air-drying characteristics, Y is a polyvalent hydrocarbon radical derived from a polyhydric alcohol to which is attached only one

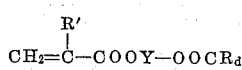

group and at least one R$_d$COO— group; —Y and R$_d$COO— are more fully described hereinafter. To be useful for the purpose of this invention, it is necessary to polymerize these monomers substantially to polymers of linear form, thus

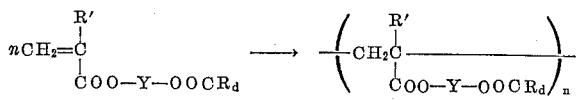

to be soluble and/or fusible. Since the primary properties of the polymer are due to the degree of linearity as well as to the length of the backbone polymer chain, it is also the purpose of this invention to prepare air-convertible polymers which are substantially linear.

The acrylic esters used in the practice of this invention are readily prepared by reacting the alcohol $$R_dCOO—Y—OH$$

with an acrylic compound of the formula

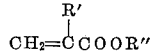

according to the general equation

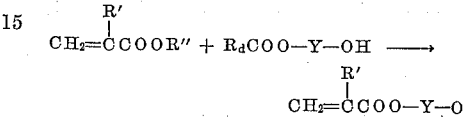

wherein R" is hydrogen or hydrocarbon radical containing one to twelve carbon atoms; in this reaction the preferred groups for R" are hydrogen and the lower alkyl radicals containing one to four carbon atoms, e.g., H, CH$_3$, C$_2$H$_5$, C$_3$H$_7$, and C$_4$H$_9$.

Alternately, the hydroxy alkyl acrylates,

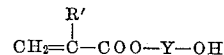

e.g., CH$_2$=CHCOOCH$_2$CH$_2$OH, now commercially available, may be esterified with the acid chloride, R$_d$COCl in the presence of a hydrohalide receptor, HAC, e.g.,

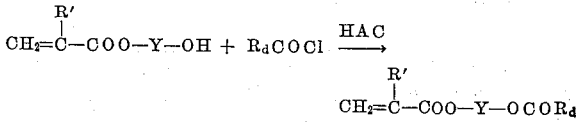

The intermediate

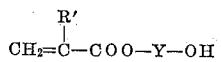

is readily prepared by monoesterifying the acrylic acid or its derivative with a polyol or its equivalent oxide using reaction conditions well known for such monoesterifications, thus

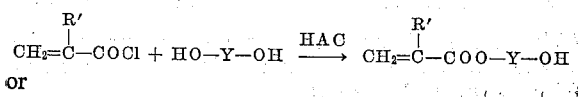

or

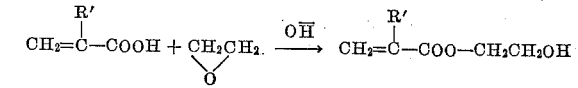

Another convenient method of preparing the acrylic esters used in the practice of this invention is to react the acrylic chlorides with the alcohols R$_d$COO—Y—OH, in the presence of a hydrohalide acceptor (HAC) such as triethyl amine, tributyl amine, pyridine, Na$_2$CO$_3$, etc.; according to the reaction

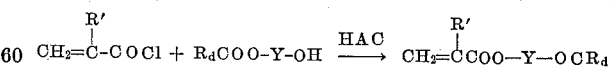

Alternately, the acid anhydrides may be used instead of the acid chlorides, thus

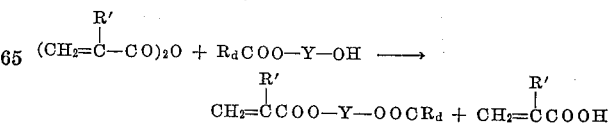

The alcohols, R$_d$COO—Y—OH from which the acrylic esters are prepared, are the hydroxy alkyl esters of unsaturated fatty acids. Typical examples of such alcohols are β-hydroxyethyl linolenate, which may be represented by $R_dCOOCH_2CH_2OH$. These hydroxy alkyl ester intermediates are prepared by esterification of the $R_dCOOH$ acids with glycols, e.g., ethylene gylcol, thus $$R_dCOOH + HOCH_2CH_2OH \rightarrow R_dCOOCH_2CH_2OH$$

or by the reaction of the acid with ethylene oxide in the presence of a base, thus

With propylene oxide, the corresponding ester is obtained. Thus,

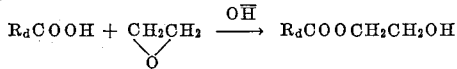

Styrene oxide produces a phenyl substituted derivative, thus

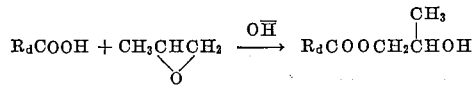

With trimethylene oxide or trimethylene glycol, the hydroxy propyl esters are obtained, such as

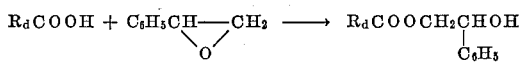

Thus it will be seen that when Y represents a radical of a dihydric alcohol, the intermediate $R_dCOO$—Y—OH is readily prepared by esterifying only one of the hydroxyl groups of the diol with an $R_dCOOH$ acid, and, if the cyclic oxide corresponding to the diol is known or available, it may be used instead of the diols. The radical Y may also represent the radical derived from alcohols higher than the diols, such as the triols, tetrols, pentols, etc., in which case more highly substituted derivatives falling within the general formula of the intermediate, $R_dCOO$—Y—OH compounds are obtained. Illustrative examples of some of the many triol, tetrol, etc. derivatives are glyceryl dioleate, glyceryl dilinoleate, glyceryl dilinolenate, pentraerythritol trioleate, etc. The glyceryl derivatives are readily prepared as is known in the alkyd resin and coating arts, by transesterification of oils with glycerine, thus

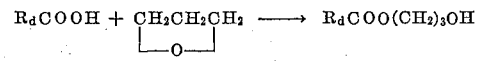

As indicated hereinabove there are easily converted to the acrylates as illustrated by the reaction of acrylic anhydride and glyceryl dioleate:

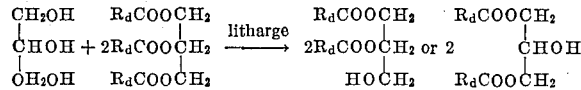

When Y is derived from a trihydric, tetrahydric or higher alcohol, all but one of the alcoholic hydroxy groups may be esterified by the $R_dCOOH$ acid with the residual hydroxyl group being converted to an acrylic ester. This is shown in the glyceryl dioleate reaction hereinabove. This is illustrated also with pentaerythritol, thus $$3R_dCOOH + C(CH_2OH)_4 \rightarrow (R_dCOOCH_2)_3C-CH_2OH$$

then

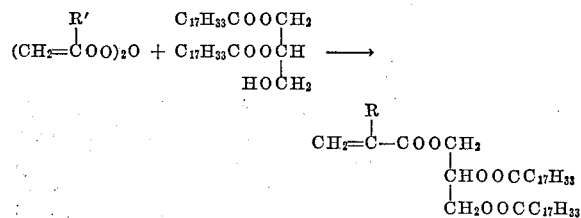

However, in the practice of this invention, the only requirement for the acrylic monomer is that the monomer contains only one

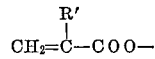

ester group and at least one $R_dCOO$— group, as illustrated with the glycols, glycerine and pentaerythritol.

When only one of the hydroxyls in a polyhydric alcohol containing more than two —OH groups is converted to an $R_dCOO$- ester, the additional —OH groups can be converted to groups other than $R_dCOO$ groups such as ordinary ester groups, RCOO— or ether groups, RO—, wherein R represents an alkyl, aryl or cycloalkyl group preferably of less than 26 carbon atoms. Thus, for example

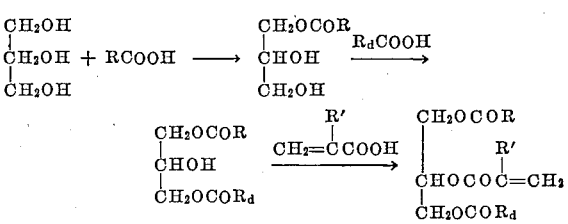

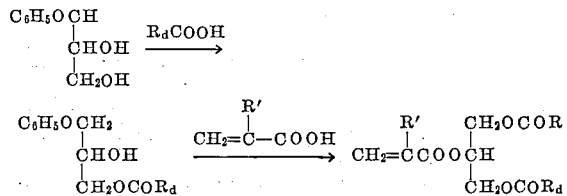

and

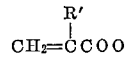

Accordingly the acrylic esters used in the practice of this invention are defined as the esters of polyhydric alcohols possessing two to six hydroxyl groups, said esters containing only one $$\underset{\underset{CH_2=CCOO}{|}}{R'}$$

group and at least one $R_dCOO$— group.

Typical examples of unsaturated $R_dCOOH$ acids useful in the preparation of these hydroxy alkyl esters intermediates $R_dCOO$—Y—OH, and from which the $R_dCOO$— group is derived, are (a) 9,12 linoleic acid,
$$CH_3(CH_2)_3(CH_2CH=CH)_2(CH_2)_7COOH$$
(b) Linolenic acid,
$$CH_3(CH_2CH=CH)_3(CH_2)_7COOH$$
(c) Arachidonic acid,
$$CH_3(CH_2)_3(CH_2CH=CH)_4(CH_2)_3COOH$$
(d) Licanic acid,
$$CH_3(CH_2)_3(CH=CH)_3(CH_2)_4CO(CH_2)_2COOH$$
(e) Parinaric acid,
$$CH_3CH_2(CH=CH)_4(CH_2)_7COOH$$
(f) Eleostearic acid,
$$CH_3(CH_2)_3(CH=CH)_3(CH_2)_7COOH$$
(g) 9,11 linoleic acid,
$$CH_3(CH_2)_5(CH=CH)_2(CH_2)_7COOH$$

These acids are obtained by the catalytic hydrolysis with water of the corresponding natural or synthetic fatty esters, all of which can be represented by the hydrolysis of methyl or glyceryl linoleate, thus

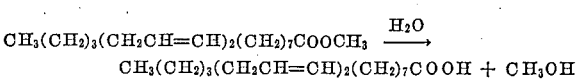

and

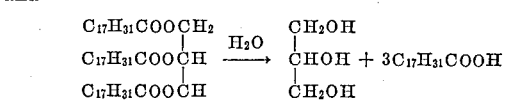

It will be observed that the seven acids (a to g) listed above contain at least two —CH=CH— unsaturated structures. In the first three, a to c, the double bonds are not conjugated whereas in d to g, the double bonds are conjugated. By subjecting the acrylic esters of this invention,

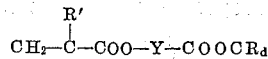

to a directed polymerization as fully described hereinafter, they are polymerized in the linear form,

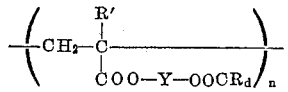

containing the —OOCR$_d$ groups pendant to the polymer backbone. In this class of polymers, it is observed that when the R$_d$ group contains conjugated unsaturation of the type shown in compounds d to g above, more rapid air-drying is achieved than when the double bonds are not conjugated.

For very rapid drying, those polymers are preferred in which at least some of the R$_d$COO— groups contain conjugated unsaturation. When very fast or very rapid drying rates are not required in the coating composition, practical and satisfactory compositions can be prepared from the monomers in which R$_d$COO contain only one —CH=CH— group. Illustrative of such fatty acids containing only one —CH=CH— group from which the esters,

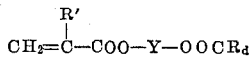

are prepared, are

Palmitoleic acid, $(CH_3)(CH_2)_5CH=CH(CH_2)_7COOH$,
Oleic acid, $CH_3(CH_2)_7CH=CH(CH_2)_7COOH$,
Petroselinic acid, $CH_3(CH_2)_{10}CH=CH(CH_2)_4COOH$,
Vaccenic acid, $CH_3(CH_2)_5CH=CH(CH_2)_9COOH$,
Gadoleic acid, $CH_3(CH_2)_9=CH(CH_2)_7COOH$,
Cetoleic acid, $CH_3(CH_2)_9CH=CH(CH_2)_9COOH$,
Erucic acid, $CH_3(CH_2)_7CH=CH(CH_2)_{11}COOH$,
Nervonic acid, $CH_3(CH_2)_7CH=CH(CH_2)_{13}COOH$, all of which are obtainable by the hydrolysis of the corresponding natural esters.

It is readily observable that in these mono-olefinic and poly-olefinic RCOO— groups that (1) there is no terminal $CH_2=C<$ structure. Instead, the terminal group is a $CH_3$— group. Moreover, (2) the first double bond in the structure is removed from the oxygen atom of its esters by at least 4 carbon atoms and by as many as 14 carbon atoms, and therefore are not activated by the ester structure. Furthermore (3) the first double bonds are removed by at least 1 carbon atoms from the terminal —$CH_3$ group which is not an activating group. Still furthermore (4) there may be 1 to 4 —CH=CH— groups in the unsaturated portion of the alcohol molecule.

In these respects, the linear acrylic polymers of this invention,

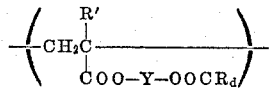

are similar in character to drying oils in that they air-dry easily. This behavior is in contrast to the allyl and methallyl acrylic polymers of the structure,

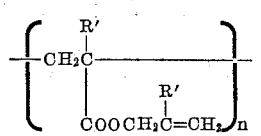

which do not air-dry. They are in even greater contrast to more closely related esters such as $$CH_3COOCH_2CH_2OCOR_d$$

which also do not air dry.

The radical R$_d$ in the monomers and polymers of this invention is defined as an unsaturated aliphatic hydrocarbon radical containing 16 to 26 carbon atoms, a terminal —$CH_3$ group, at least one and no more than 4 —CH=CH— groups and the remainder of the R$_d$ group consisting of —$CH_2$— groups. In some cases, one $CH_2$

may be replaced by a keto,

group, as in licanic acid.

For the purposes of this invention, the pure individual R$_d$COOH acids are not required although some of them have become available commercially in different degrees of purity. Mixtures of the acids, such as are obtained by the hydrolysis of vegetable, animal and marine oils and fats are satisfactory. Since such oils and fats are mixtures of various glycerides, the acid composition resulting from the hydrolysis of the ester groups correspond equivalently to the relative proportions of the various acid moieties present in the glyceride. Table 1 gives the percentage composition of the fatty acids in a number of drying oils, which on hydrolysis produce relative proportions of the corresponding acids.

TABLE 1

| Oil | Percent of Total Fatty Acid | | | | | | |
|---|---|---|---|---|---|---|---|
| | Palmitic | Stearic | Oleic | Linoleic | Linolenic | Licanic | Eleostearic |
| Soybean | 6.5 | 4.2 | 33.6 | 52.6 | 2.3 | | |
| Oiticica | 5.0 | 5.0 | 5.9 | 10.0 | | 74.1 | |
| Tung | 4.0 | 1.5 | 15.0 | | | | 79.5 |
| Linseed | 5.0 | 3.5 | 5.0 | 61.5 | 25.0 | | |
| Perilla | 7.5 | | 8.0 | 38.0 | 46.5 | | |

It will be noted in Table 1 that all of the oils have measurable amounts of compounds having one or more than one double bond in the fatty acid, and therefore, the derived acids have a substantial amount of suitable mono- and poly-unsaturation suitable for the purposes of this invention. Palmitic and stearic acids are saturated acids, and if present in the mixture during esterification with a polyhydric alcohol, HO—Y—OH, they also become converted to esters of the

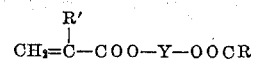

type and copolymerize with the

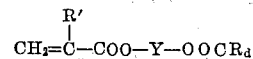

monomers lending flexibility and ductility to the polymerization product. Mixtures of such acids are useful and the monomeric esters resulting from such mixtures are also contemplated in the practice of this invention.

As shown hereinabove, the radical Y is derived from polyols containing at least two hydroxyl groups, one of which is esterified with an acrylic moiety,

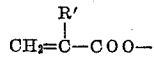

and at least one which is esterified with an R$_d$COO— moiety. Thus the monomers of this invention may be written as

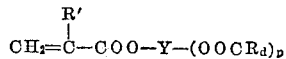

wherein p represents an integer of 1 to 5, and Y is a polyvalent hydrocarbon radical containing 2 to 18 carbon atoms in which the valencies not occupied by

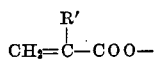

are occupied by hydrogen, R″ hydrocarbon radicals containing 1 to 18 carbon atoms, —OR″ radical, —OOCR″ radical, and —O— radical. Illustrative polyols of the formula HO—Y—OH, as well as some cyclic oxides from which the —Y— groups are derived, are:

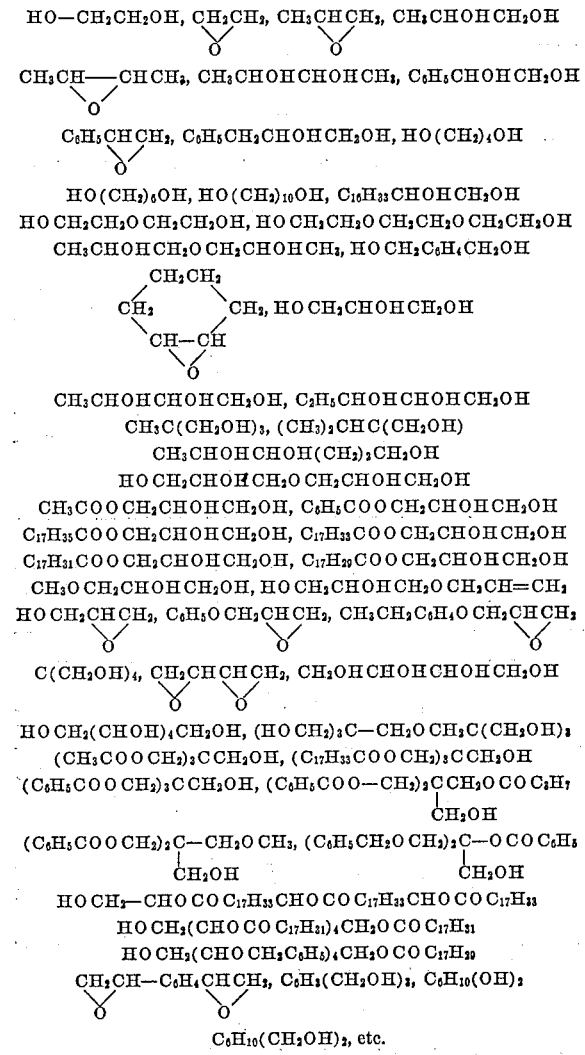

$C_6H_{10}(CH_2OH)_2$, etc.

The monomers of the formula

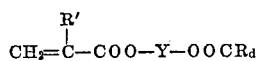

possess a multiplicity of polymerizable double bonds, at least one of which is the

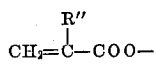

group which is extremely reactive, and at least one —HC=CH— group and in some cases four —CH=CH— groups. Since in a polymerization, all of the bonds can participate, it would be expected that crosslinked, insoluble, infusible polymers would be obtained from these monomers. When these monomers are polymerized by radical initiation, crosslinked gelled polymers result. Similar insoluble products are obtained with thermal polymerizations. When cationic initiators such as $BF_3$, $AlCl_3$, $H_2SO_4$, $SnCl_4$, and $TiCl_4$ are used, insoluble, infusible products are also obtained.

However, I have now discovered that useful linear, soluble polymers and copolymers are obtained when a base-catalyzed polymerization is performed, such as an anionic polymerization. By a base-catalyzed polymerization is meant a polymerization in which the propagation of the polymer chain occurs through a carbanion. This may be illustrated by rewriting the monomers

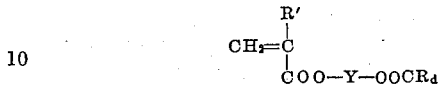

as

wherein $R_a$ represents —COO—Y—OOCR$_d$. Thus

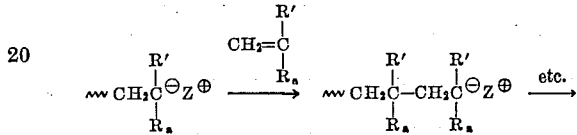

in which $Z^\oplus$ is a positive counter ion, usually of a metal, typically an alkali or alkaline earth metal. The propagation step is preceded by an initiating step; and initiation may be brought about in a number of ways.

The anionic polymerization can be initiated by an alkali metal hydride such as NaH, LiH, KH, CsH, including complexes thereof such as $KAlH_4$ $LiAlH_2$, etc. Designating such hydrides as MH, then the initiating step is

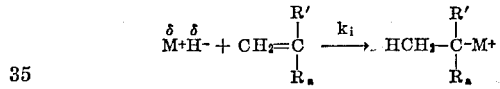

When an alkali metal hydrocarbon is used, the initiating step is given as

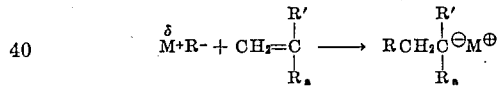

in which the cation $M^{\delta+}$ represents Li, Na, K, Cs, etc., and the anion $R^-$ represents an aliphatic, aromatic, or cycloaliphatic hydrocarbon of 1–20 carbon atoms, such as methyl, ethyl, propyl, isopropyl, butyl, amyl, isoamyl, benzyl, triphenyl methyl, phenyl, cycloalkyl, octyl, etc. A few typical examples of $\overline{MR}$ are $(C_6H_5)_3CNa$,

BuLi, $C_6H_5CH_2Cs$, allyl sodium, etc. A Grignard reagent $\overline{R}MgX$, may also be used to initiate an anionic polymerization, thus

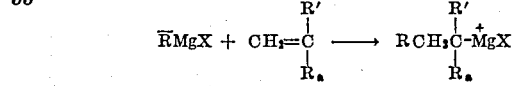

Illustrative examples of $\overline{R}MgX$ are phenyl magnesium bromide, butyl magnesium bromide and chloride, vinyl magnesium bromide, allyl magnesium bromide, etc.

The free alkali metals may also be used to initiate polymerization, especially when the metal, M°, gives up an electron to form an ion radical of the monomer, thus

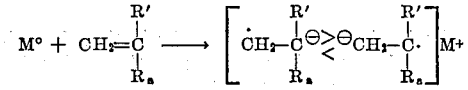

The ion radicals couple to form a dianion, thus

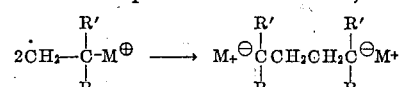

as a step in the initiation mechanism.

A similar mechanism occurs in the anionic initiation using an alkali metal and naphthalene, anthracene, α-methyl styrene tetramer, etc., as illustrated by naphthalene, thus

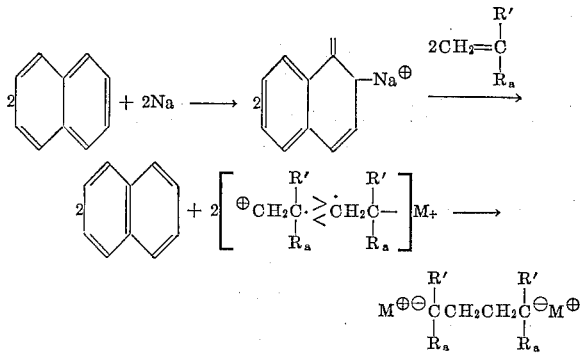

The alkali metals in liquid ammonia are also effective anionic polymerization intiatiors which may function in either of two ways. Thus, in the case of potassium or sodium in liquid ammonia, the resulting amide functions as the initiator:

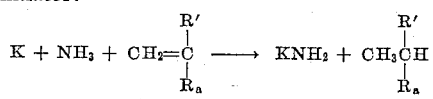

then

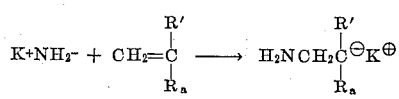

In the case of lithium, an ion radical is formed in the reaction which acts as the initiator, thus

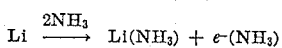

where $e^-$ is an electron, then

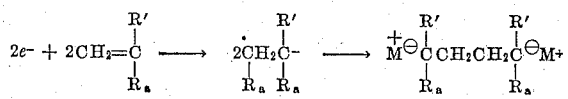

In the ammonia amide series, the order of reactivity of the cations is given as $KNH_2 > NaNH_2 > LiNH_2$
$> Ca(NH_2)_2 > Sr(NH_2)_2 > Ba(NH_2)_2$ In a similar way anionic initiation can be brought about by ketyls which are the reaction products of an alkali or alkaline earth metal with a ketone such as benzophenone in ether, thus

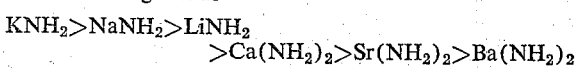

The anionic polymerization can be performed with the monomers of this invention, alone or in the presence of a liquid diluent, at temperatures ranging from about −80° C. to 80° C. but for most monomers the range of −40° C. to 60° C. is satisfactory. In general, −20° C. to 40° C. is preferred. The solvent, or diluents, when used may be selected from the class of aliphatic and aromatic hydrocarbons, ketones, ethers and esters, such as butane, propane, hexane, heptane, octane, cyclohexane, benzene, toluene, xylene, dimethyl ether, diethyl ether, dibutyl ether, tetrahydrofurane, dioxane, diphenyl ether, dibenzyl ether, dimethyl ethylene glycol ether, dibutyl ethylene glycol ether, diethyl-diethylene glycol ether, etc. The diluent or solvent (HSol) can also act to control the molecular weight of the polymerization by solvalitic chain transfer with the anion when protonic solvents are used, thus

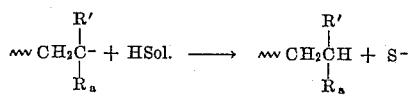

Anionic polymerizations are also referred to as base-catalyzed polymerizations.

While the particular acrylates,

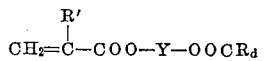

of this invention are polymerized anionically, a number of other substituted acrylic ester derivatives are unsuitable. For example, the α-chloro acrylic esters,

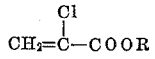

whose polymers,

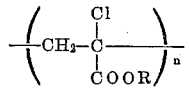

contain halogen which reacts with and destroys the anionic initiator. The itaconic esters, which are substituted acrylic esters,

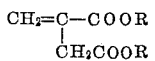

polymerize extremely slowly and to low molecular weight, probably because of the allicyclic hydrogens in the

—$CH_2COOR$ groups.

On the other hand, the α-cyano-acrylates,

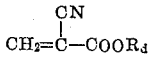

are suitable since they polymerize easily. However, they are considered less desirable for economic reasons, except where applications requiring coatings of improved resistance to solvent.

For economical use as coating compositions, it is wasteful as well as unnecessary to use homopolymers of the monomers of this invention,

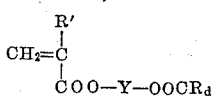

since the high activity of polymers having such an abundance of air drying functions such as in

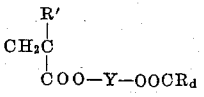

is not need in most cases, although they can be used as such in castings for encapsulation or impregnation.

In most applications, copolymers with other monomers are preferred particularly when it was discovered that the air drying property of these monomers is conferred on the copolymers, which may be dipolymers, tripolymers, etc., depending on the number of additional monomers used as well as on the identity of the

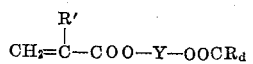

monomer, which in the case where it is prepared from $R_dCOOH$ acids derived from certain natural oils such as linseed or oiticica oil contain 5 different esters, as shown in Table 1.

In many cases, especially with the pure monomers of the formula

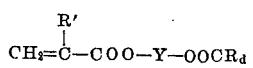

in which $R_d$ contains four —HC=CH— groups, copolymers containing 0.5 to 1% of these monomers are practically useful. However, to achieve better air drying rates, copolymers containing at least 5% are preferable, and when the $R_d$ group contains fewer —CH=CH— groups, 10 to 20% in the copolymer is desirable. When the monomer is produced from alcohols of oils having a high percentage of saturated higher fatty acids, then 50–80% or more are preferable. Accordingly, depending on the end product desired and the use to which it is to be put, homopolymers and copolymers containing as little as 0.5% are useful. When less than 0.5% such as 0.1% is used, drying is greatly reduced but, in this case, a noticeable plasticizer effect is evident, and in this aspect, these copolymers are useful and valuable. Obviously, those copolymers having more than 0.1% show higher internal plasticization, and when this particular property is desired, it is achieved by the practice of this invention. Accordingly, a wide range of compositions can be made by copolymerizing the monomers of this invention with one or more other monomers containing a vinyl, $CH_2$=CH— group, a vinylidene $CH_2$=C< group, or a vinylene

—CH=CH— group.

Illustrative examples of other monomers containing such groups are the acrylic esters such as methyl acrylate, ethyl acrylate, propyl acrylate, butyl acrylate, hexyl acrylate, phenyl acrylate, benzyl acrylate, methyl-α-chloro acrylate, etc.; the methacrylic esters such as methyl methacrylate, ethyl methacrylate, propyl methacrylate, methallyl methacrylate, etc.; the vinyl esters such as vinyl chloride, vinyl acetate, vinyl stearate, vinyl benzoate, vinyl methyl phthalate, vinyl ethyl succinate, etc.; the polymerizable amides and nitriles such as N-dimethyl acrylamide, N-diethyl methacrylamide, acrylonitrile, methacrylonitrile, etc.; the alkenyl aryl compounds such as styrene, o-methyl styrene, p-methyl styrene, α-methyl styrene, the chloro-styrene, vinyl methoxy benzene, diallyl benzene, etc.; the vinylidene compounds such as vinylidene cyanide, methylene malonic esters, etc.; vinylene compounds such as vinylene carbonates, and the maleic esters, especially the maleic diesters of the lower alcohols; the itaconic compounds such as itaconic anhydride, the itaconic esters of the lower and higher aliphatic alcohols; the dienes such as butadiene, isoprene, and the like.

The proportion of the new monomers in copolymers with other monomers will depend, in accordance with the accepted principles of copolymerization, on the reactivity and selectivity constants of the comonomers used in preparing the copolymer, the ratio of the monomers used and the extent of conversion. However, by selecting appropriate conditions for the copolymerization, copolymers, using the new monomers of this invention, can be made to contain effective and small amounts of these new monomers, for example, of the order of from 0.1% to 0.5% to very high amounts of the order of 99.5% to 99.9% in the final copolymer products.

In anionic copolymerizations, the copolymerization parameter, $r_1$ and $r_2$, are sometimes influenced by the solvent if one is used. For example, when a 50% benzene solution of a mixture of 90% styrene and 10% of $CH_2$=CHCOOCH$_2$CH$_2$OOCC$_{18}$H$_{31}$ is polymerized at 30° C. with Na as an initiator, less than 1% of the acrylate feed is found in the copolymer whereas when the polymerization is performed in bulk without a solvent, about 33% of the acrylate is found in the copolymer. On the other hand, when the monomer $CH_2$=CHCOOCH$_2$CH$_2$OOCC$_{18}$H$_{31}$ is copolymerized with ethyl acrylate, 100% of this monomer is found in the copolymer whether the copolymerization is performed in bulk or in solution. Thus, while it is seen that some monomers copolymerize less readily with the monomers of this invention, the resulting copolymers may still be used as air-convertible compositions.

The comonomers give corresponding repeating units such as

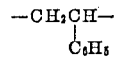

from styrene;

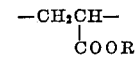

from acrylates where R is as defined herein, e.g.

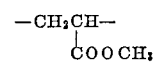

from methyl acrylate;

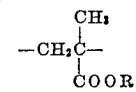

from methacrylates, e.g.

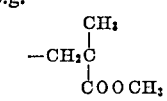

from methyl methacrylate, etc.

The polymers and copolymers of this invention may be used as prepared or blended or compounded with other polymers and ingredients. When prepared and obtained in a viscous liquid form they may be used without solvent for casting, laminating and impregnating uses, or, to lower the resin content, or to control or regulate the viscosity, they may be diluted with solvents or emulsified with water and used in latex form. When obtained as soft resins, they can be diluted or emulsified, or used as melts to coat or impregnate substrates. When prepared as hard polymers they can be used in solution, or in emulsion or in dispersions, or as dip-melts, or spray-melts, or fluidized-melts, etc. The polymers and copolymers may be blended with other drying-, semi-drying or non-drying oils with or without a solvent; or they may, in a similar way, be blended or reacted with alkyd resin, modified with drying or semi-drying oil acids, oil-soluble phenolic resins, oil-modified phenolic resins, etc. They may be used as blends with other film-forming polymers, such as nitro-cellulose, polyvinyl acetate, polymethyl methacrylate, polyvinyl chloride and its copolymers, polystyrene and its copolymers, especially the butadiene copolymers; the blends being achieved either in solution or in emulsion, or without solvents.

The polymers and copolymers of this invention, including blends with other polymers may be converted to varnishes, paints, enamels and impregnants in the usual way and can be mixed with dyes, solvents, pigments, lubricants, stabilizers, etc., as is common in the coating arts. As such they are useful not only as direct coatings but are particularly satisfactory for the preparation of oil cloths, electrical oil-cloth-insulating tapes, rain coats, linoleums, inks, etc., when fabrics, paper, cloth, cork, mica, etc., are coated or impregnated with these compositions.

When properly prepared, the polymers and copolymers of this invention are substantially colorless or nearly so, if the monomer is colorless, and the dried films are more resistant to yellowing than films prepared from drying oils or drying oil-modified alkyd resins and similar compositions. For this reason, they are especially valuable in the preparation of varnishes and paints for use by artists in art works, portraits, metal gilts, etc.

The following examples illustrate the practice of this invention and are used by way of illustration and not by limitation. All parts and percentages are parts and percentages by weight, unless otherwise specified.

*Example I*

Three hundred twenty-four parts of freshly distilled hydroxyethyl linoleate, $C_{17}H_{31}COOCH_2CH_2OH$, 0.1 part of tertiary butyl catechol, and 185 parts of tributyl amine are added to 1000 parts of diethyl ether in a suitable container equipped with stirrer, reflux condenser and heating and cooling means. The mixture is blanketed with nitrogen gas fed through an inlet. To this mixture is added over a period of 2 hours and at 20° C., 91 parts of acrylyl chloride in 200 parts of ether, following which the temperature is raised to 30–35° C. for 1 hour. The mixture is then washed with dilute hydrochloric acid and then with water to remove trimethyl amine hydrochloride, followed by washing with dilute aqueous sodium carbonate and again with water until neutral. The resulting ether solution of the ester, $$CH_2=CHCOOCH_2CH_2OCOC_{17}H_{31}$$

is dried over anhydrous $Na_2CO_3$, decolorized with active carbon and filtered. The monomer may be polymerized in the dry ether solution or isolated by distillation at reduced pressure and used as a distilled product; boiling point of the ester is 178–192° C. at 2–4 mm. pressure. Analysis for carbon and hydrogen gives values of 72.92% C and 10.18% H, which are in good agreement with the theoretical values for the compound. The polymer of this monomer has the repeating unit

When 326 parts of hydroxyethyl oleate are used instead of the linoleate, then the corresponding ester, $$CH_2=CHCOOCH_2CH_2OCOC_{17}H_{33}$$

is obtained, whereas when 322 parts of hydroxyethyl linolenate is used then the corresponding ester, $$CH_2=CHCOOCH_2CH_2OCOC_{17}H_{29}$$

is obtained, which on analyses for carbon and hydrogen give values of 72.72% C and 10.35% H, which are in close agreement with the theoretical values for these compounds. Similarly, when 105 parts of methacrylyl chloride is used instead of acrylyl chloride in this procedure, then the corresponding esters,

and

are obtained.

When the above oleate acrylate monomer is polymerized, the polymer has repeating units of the formua

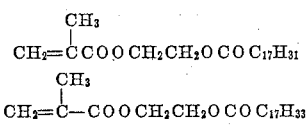

When the corresponding linoleneate is polymerized, the polymer has the repeating units of the formula

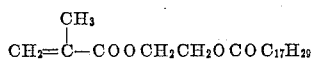

Example II

One hundred parts of methyl methacrylate, 162 parts of redistilled hydroxyethyl linoleate, 0.5 part tertiary butyl catechol, and 1.5 parts of sodium methylate are heated to 80–100° C., the methyl alcohol resulting from transesterification is removed continuously in a distillation column until no more methyl alcohol is released, the sodium is neutralized with gaseous HCl, the NaCl product is removed by filtration, and the excess of methyl methacrylate is removed by distillation, leaving the crude ester

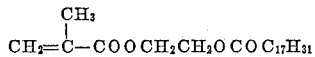

which may be used as such or purified by treatment with active carbon and distillation as in the procedure of Example I, P.P. 184–196° C. at 4–6 mm.

Example III

One hundred fifty-four parts of methacrylic anhydride and 324 parts of hydroxyethyl linoleate and 185 parts of tributyl amine are reacted and then isolated according to the procedure of Example I and the methacrylic ester identical to that of Examples I and II is obtained.

When acrylic anhydride is used instead of the methacrylic anhydride of this example, the acrylic ester of Example I is obtained.

Example IV

Three hundred twenty (320) parts of a redistilled commercial product comprising unsaturated fatty acids derived from soybean oil, and containing the following acids in the proportions Linoleic acid 53%  
Linolenic acid 7%  } _____ Unsaturated 85%.  
Oleic acid 25%

Palmitic acid 8%  
Stearic acid 6% } _____ Saturated 15%.  
Other acids 1% are reacted at 150° C. with 44 parts of ethylene oxide in a pressure autoclave at 110° C. in the presence of 1 part of KOH during the course of two hours. The reaction product is cooled, neutralized with acetic acid and flash distilled at 2 mm. pressure. The mixed hydroxy alkyl esters are substituted for the hydroxyethyl linoleate of Example I and esters corresponding to the formulas

and

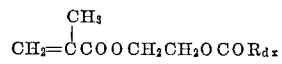

are obtained, in which $R_{dx}$ represents the mixed hydrocarbon groups in the mixed acids.

Example V

Example IV is repeated using a mixture of commercial unsaturated fatty acids having an iodine value of 170, containing the approximate composition Linoleic acid 18%  
Linolenic acid 48% } _____ Unsaturated 88%.  
Oleic acid 22%

Palmitic acid 7% } _____ Saturated 12%.  
Stearic acid 5% resulting in the mixed esters,

and

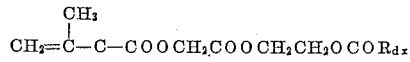

Example VI

Example IV is repeated using a mixture of unsaturated acids comprising oleic acid in the major amounts, and linoleic, linolenic, palmitic, and stearic acids in the minor amounts with an iodine value of about 90, and there is obtained the corresponding mixed esters of the formula

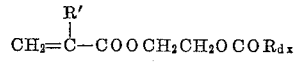

Example VII

Under an inert nitrogen atmosphere, to fifty parts each of the $CH_2=CHCOOCH_2CH_2OOC_{17}H_{31}$ monomer of Example I in five separate reaction vessels is added 50 parts of anhydrous benzene and (1) 0.1, (2) 0.25, (3) 0.50, (4) 1.00, (5) 1.5 parts respectively of micronized sodium at 25° C. Within about one hour, the solution, due to the presence of acrylyl-type anions, becomes yellow, with the dissolution of the sodium. The mixture is agitated for 48 hours at 25° C. and anhydrous HCl gas is passed into the mixture to discharge the color, after which the solid NaCl is removed from the solution by filtration. The resulting solutions of polymer in benzene may be used as such or the polymer may be isolated by removing the solvent by distillation at 15 mm. pressure. The yield of residue is substantially quantitative and all of them are very viscous thick products. The polymer prepared with 0.1 part (0.25% based on the monomer) of sodium initiator is the most viscous and the polymer prepared with 1.5 parts of sodium (3% on the monomer) is the least viscous, with the other polymers prepared with sodium concentrations between 0.5 and 4% having viscosities between these two extremes.

*Example VIII*

Example VII is repeated in the absence of benzene solvent but at 30° C. for 72 hours to effect better dissolution of the sodium. Polymers similar to those of Example VII are obtained.

*Example IX*

The procedure of Example VII is repeated with the methacrylate,

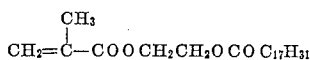

$$CH_2=\overset{CH_3}{\underset{|}{C}}-COOCH_2CH_2OCOC_{17}H_{31}$$

instead of the acrylate, and polymers more viscous than the corresponding acrylates are obtained.

*Example X*

In an inert atmosphere, a mixture of 80 parts of ethyl acrylate and 20 parts of the acrylate, $$CH_2=CHCOOCH_2CH_2OCOC_{17}H_{31}$$

of Example I are added to 200 parts of anhydrous benzene. To this solution is added 1.1 parts of micronized sodium in 1.1 parts of kerosene at 25° C. which is allowed to react for 24 hours with slow agitation. The resultant mixture is neutralized with 2.8 parts of glacial acetic acid and the solution then filtered to remove precipitated salts. The copolymer yield is almost quantitative, and the viscosity molecular weight based on the equation $$MW. = \frac{[\eta]}{k}$$

where $K=1.3\times10^{-5}$, with $[\eta]=0.132$ is about 10,000. Titration of the copolymer with bromine for unsaturation shows that the copolymer contains about 20% of the acrylate in the copolymer.

*Example XI*

The procedure of Example X was repeated twice using instead of 20 parts of linoleic ester acrylate, 20 parts respectively of $$CH_2=CHCOOCH_2CH_2OCOC_{17}H_{33}$$

and $$CH_2=CHCOOCH_2CH_2OCOC_{17}H_{29}$$

The corresponding copolymers of ethyl acrylate of approximately the same molecular weight are obtained. After filtration of the benzene solutions, they are evaporated at 20° C. at 10 mm. and almost quantitative yields of rubbery acrylate-type copolymers are obtained with only slight trace of yellow color. These are soluble in common solvents, such as the acetone, toluene, ethyl acetate and carbon tetrachloride.

*Example XII*

The procedure of Example X is repeated using 93 parts of methyl methacrylate and 7 parts of the methacrylic ester,

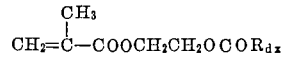

$$CH_2=\overset{CH_3}{\underset{|}{C}}-COOCH_2CH_2OCOR_{dx}$$

of Example IV and 2 parts of BuLi (as a 30% solution in ethyl ether) are added under a nitrogen atmosphere to 200 parts of anhydrous benzene and held at 0° C. for 15 hours. Then the mixture is allowed to heat to room temperature during a period of 3 hours, following which 3 parts of glacial acetic acid is added to neutralize the lithium and the solution filtered. The polymer solution is then poured into hexane and 96 parts of solid, precipitated copolymer is obtained which, on analysis, indicates a copolymer of approximately 92.6% ethyl methacrylate and 7.4% of the

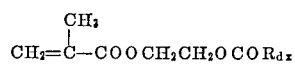

$$CH_2=\overset{CH_3}{\underset{|}{C}}-COOCH_2CH_2OCOR_{dx}$$

monomer. In a similar manner a 50–50 copolymer is prepared from equal parts of methyl methacrylate and the methacrylate ester of Example IV.

*Example XIII*

The procedure of Example X is repeated using 85 parts of butyl methacrylate, 15 parts of the methacrylic ester,

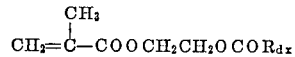

$$CH_2=\overset{CH_3}{\underset{|}{C}}-COOCH_2CH_2OCOR_{dx}$$

of Example IV and 5 parts of finely divided sodium hydride in a sealed reactor which has been degassed and blanketed with deoxygenated nitrogen and the polymerization conducted at −5° C. to 5° C. for 24 hours. The reaction product is then neutralized with 10 parts of anhydrous acetic acid, filtered and then concentrated by distillation at 10 mm. at 25° C., leaving 97.6 parts of a rubbery copolymer.

*Example XIV*

The procedure of Example X is repeated using 65 parts of methyl methacrylate, 25 parts of methyl acrylate and 10 parts of the acrylic monomer, $$CH_2=CHCOOCH_2CH_2OCOR_{dx}$$

of Example VI as the monomer feed and the corresponding tripolymer is obtained.

*Example XV*

In an inert atmosphere 100 parts of allyl methacrylate and 2 parts of sodium are mixed with 200 parts of anhydrous benzene is reacted with stirring at 25° C. for 24 hours, then neutralized with 3 parts of anhydrous acetic acid and the sodium acetate removed by filtration from the solution of polymeric allyl methacrylate.

*Example XVI*

Example XV is repeated using allyl acrylate instead of allyl methacrylate and a solution of the corresponding polymer in benzene is obtained.

*Example XVII*

Example XV is repeated using N,N-diallyl acrylamide instead of allyl methacrylate in dioxane and a solution of the corresponding polymer is obtained.

*Example XVIII*

To individual portions of ten parts each of the five polymers of Example VII in twenty parts of benzene is added 0.1 part of commercial 10% drier solution containing lead, manganese and cobalt in the approximate ratio of 9.6:1:1.8 as naphthenates. Films are prepared from these solutions on glass plates and the solvent allowed to evaporate at room temperature. On evaporation of the solvent, the residue varies from viscous, oily coatings to tacky films. These films which are originally soluble in benzene and acetone become converted in eight hours to dry, substantially colorless, elastic tough films, insoluble in benzene, acetone and dioxane.

*Example XIX*

The procedure of Example XVIII is repeated using the polymer solutions of Examples XV, XVI, and XVII. The coatings are still soluble in benzene, acetone and dioxane at the end of 8, 16, 24, and 48 hours. However, when these coatings are heated at 200° C. for 30 minutes, insoluble films are obtained.

*Example XX*

The procedure of Example XVIII is repeated with (1) the methacrylate polymers of Example IX; (2) the ethyl acrylate copolymer of Example X; (3) the two acrylate copolymers of Example XI; (4) the butyl methacrylate copolymer of Example XIII; (5) the methyl methacrylate-methyl acrylate terpolymer of Example XIV. In each case, the resultant coating becomes converted to a benzene insoluble film in 8–11 hours at room temperature.

*Example XXI*

The procedure of Example XVIII is repeated with the polymer of Example XII and an almost colorless, clear, dry, tack-free film is obtained on evaporation of the solvent for 2 hours. This film converts slowly to an insoluble film which is partly dissolved in 24 hours and swells without dissolution in 48–72 hours.

*Example XXII*

Linseed oil is heat polymerized at 290° C. under nitrogen atmosphere for 12 hours. Then the experiment is repeated using a mixture of 90% by weight of linseed oil and 10% by weight of the polymer (2) of Example VII. The viscosities of the stand-oil and polymer-modified stand oil are compared in Table 2.

TABLE 2

| Time in hours | Viscosity of Oil in Process | Viscosity of oil plus polymer |
|---|---|---|
| 1 | 1.16 | 3.7 |
| 2 | 1.59 | 29.6 |
| 4 | 3.52 | 74.4 |
| 6 | 9.3 | 148.7 |
| 8 | 24.6 | 206.3 |
| 10 | 83.4 | 292.1 |
| 12 | 195.8 | |
| 16 | 391.2 | |

It will be noted that the addition of polymer to the oil causes a more rapid increase in the viscosity of the resulting stand-oil, and that at least 16 hours of heating are required by the unmodified oil to attain a viscosity equal to about eight hours heating of the polymer-modified oil. The same improvement in a reduction of the time required to prepare stand oils from tung, perilla, oiticica, corn, hempseed, safflower, sandal seed and sunflower oil is observed when the polymers of this invention are added to the oil before heat treatment as above. Depending on the oil, the modified stand oil is prepared at temperatures varying from 240° C. to 310° C. and for periods of time varying from 1 hour to 12 hours, a factor which is also controlled by the amount of polymer added to the oil, and a reduction in the heating time is noted also when the other polymers of Example VII, and Examples VIII to XIV are added to the oils before or even during the heat treatment. The modified stand oils can be formulated into varnishes by dilution with solvents to which are added metallic driers, or they can be emulsified after drier addition and used in emulsion form.

*Example XXIII*

To fifty parts of a long oil glyceryl phthalate alkyd resin containing 55% of combined linseed oil fatty acids in toluene is added 25 parts of a 50% solution in toluene of the polymer of Example XII and the drier content adjusted to 0.1% of metal content on the basis of polymer content. Films of this varnish dry in 2.5 hours whereas films prepared from this alkyd resin are not dry in 5.5 hours. A marked improvement in drying time is also noted when the polymers of Examples VII to XI, XIII and XIV respectively are added in various amounts to a long oil glyceryl phthalate alkyd resin; and even a greater improvement is noted when these polymers are added to a short oil alkyd resin containing about 40% of combined linseed oil fatty acids.

*Example XXIV*

Linseed oil of specific gravity 0.9290, and containing 0.05% soluble lead salts and 0.08% soluble manganese salt, is heated to 80° C. while a stream of air is blown through it for 20 hours and a "boiled oil" of gravity 0.940 is obtained. When the process is repeated with a mixture of the same oil containing 10% of polymer (2) of Example VII, a boiled oil of the same gravity is obtained in 13–15 hours.

*Example XXV*

To 10 parts of the polymer (2) of Example VII is added 6 parts of a solid para-phenyl phenol-formaldehyde resin. The mixture is heated to 220° C. until a clear melt results when a drop is removed and placed on a glass plate, after which the reaction mass is dissolved in 35 parts of a solvent mixture having a ratio of 2 parts of white spirits to 1 part of toluene and containing 0.1 part based on the polymer, of a commercial metal drier. A film cast from this solution dries to a tack-free glassy, water-resistant film in 2–3 hours.

Similar good results are obtained when a tertiary butyl phenolformaldehyde resin is used instead of the phenylphenol resin.

*Example XXVI*

To each of the six acrylic and methacrylic esters of Example I corresponding to the formula

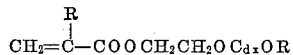

is added 1.5% by weight of benzoyl peroxide and the mixture heated at 80–85° C. No noticeable polymerization occurs in 6–8 hours, but in 24–48 hours, benzene-insoluble crosslinked gels are obtained.

*Example XXVII*

To a mixture of 90 parts of methyl methacrylate and 10 parts of

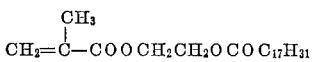

is added 1 part of benzoyl peroxide and the mixture heated at 80–85° C. A benzene and acetone insoluble copolymer is obtained in 24 hours. Similar results are obtained when the other five monomers of Example I are used instead of the linoleic derivative.

*Example XXVIII*

To a mixture of 80 parts of styrene and 20 parts of $CH_2=CHCOOCH_2CH_2OCOC_{17}H_{31}$ is added 0.3 part of $BF_3$ at room temperature, and a dark, brownish mass insoluble in benzene is obtained.

*Example XXIX*

To each of 100 parts of oleic acid, linoleic acid and linolenic acid is added 0.1 part of the drier of Example XVIII and glass plates coated with the mixtures. No drying occurs at room temperature in 6 days.

Example XXX

To 100 parts of $CH_3COOCH_2CH_2OCOC_{17}H_{33}$ (prepared from acetic anhydride and hydroxyethyl linoleate) is added 0.1 part of the drier of Example XVIII, and glass plates coated with the mixture as in Example XXIX. No drying is observed in 6 days at room temperature.

Example XXXI

To 400 parts of anhydrous liquid ammonia at −77° C. is added 0.1 part of sodium with the formation of a blue color indicating $NaNH_2$ has formed and then is added a mixture of 18 parts of methyl methacrylate and 2 parts of

A solid copolymer is formed which is removed by filtration. This product is washed with a 50—50 methyl alcohol-water mixture containing 3 parts HCl, followed by washing twice with a 50—50 methyl alcohol-water mixture, then dried in vacuo to constant weight, and a 94.6% yield of polymer is obtained.

Example XXXII

A flat enamel is prepared according to standard procedures in the painting arts containing 55% pigment and 45% vehicle in the following proportions:

Total pigment 55% comprising:
- 57.2% titanium pigment
- 36.0% calcium carbonate
- 4.8% diatomaceous silica
- 1.98% zinc stearate Total vehicle 45% comprising:
- 20.0% polymer of Example XXXI
- 5.2% polymer stand oil of 395 viscosity of Example XXII
- 74.8% solvent (50—50 mineral spirits-toluene) containing 0.15 part metal drier A sized plaster surface is coated with this paint which dries in about three hours, appearing as a very white satin finish. The coating has excellent water resistance and can be rewashed repeatedly.

Example XXXIII

A commercial acrylic latex paint is applied (without first applying the sizing undercoat recommended when a latex paint is applied over oil-type paints) to wood previously coated with a drying oil-alkyd type paint and aged for at least 3 months, and allowed to air-dry for 24 hours before being exposed to weathering.

To another part of the same acrylic latex is added 5% by weight of the copolymer of Example XIII (previously emulsified as a 40% emulsion in water with dodecylbenzene sodium sulfonate) and applied in the same way as the unmodified acrylic latex. At the end of six months, peeling and blistering is observed in the film with the commercial latex, whereas the modified latex coating is continuous and intact.

In a similar manner, vinyl acetate and styrene-butadiene latices can be modified by the addition of the polymers of this invention to improve their properties.

Example XXXIV

A mixture of 70 parts of asphaltic bitumen (M.P. 90° C.) and 30 parts of polymer (2) of Example VII are heated at 100° C. for 15 minutes, and then diluted with 70 parts of solvent mixture containing 80% white gasoline and 20% benzene and 0.03 part of metallic driers.

This solution is used to coat tin plate and allowed to dry for 6 days. A similar solution of the asphaltic bitumen is prepared without including the polymer of Example VII and air dried for a similar period of time. When both plates are placed in an oven and the temperature raised to 95° C., the coating not containing polymer sags and flows, whereas the solution containing the polymer does not sag or flow. Mixtures of asphaltenes of this type with the polymers of this invention, are particularly suitable for the preparation of gutter paint, rust-proofing and water resistant coatings for underground pipes of all kinds including iron, brass, copper, and for exposed metal, ceramic, clay, wood, wall board, concrete and stone surfaces, as well as for the preparation of asphalt shingles, roofing paper, etc. Instead of the asphaltic bitumen, other bitumens such as blown asphaltic bitumens, stearine pitches, Grahamite (an asphaltum from Virginia and Oklahoma), Gilsonite (an asphaltum from Utah), coal tar pitches, etc., can also be modified by the polymers of this invention to improve their flow properties.

Example XXXV

A mixture of 340 parts of

and 11.5 parts of sodium are reacted at 50° C. according to the procedure of Example VII and the product isolated. Molecular weight determinations indicate that the product is a dimer. To 100 parts of the dimer is added one part of the drier of Example XVIII and a film prepared on a glass plate dries in 6–7 hours.

Example XXXVI

To 30 parts of polymer (1) of Example VII is added 1.5 parts of sodium dioctyl sulfosuccinate and the mixture heated with agitation at 100° C. until a uniform mixture is obtained, following which there is added 70 parts of water heated to 70° C. and a smooth emulsion is obtained. The addition of metallic driers such as the water soluble salts of a mixture of cobalt, lead and manganese acetates produces a latex varnish which air dries within four hours when laid down as a film on glass, iron, and aluminum plates. The latex can be pigmented in the usual way to produce high gloss enamels, satin-finish enamels, or semi-gloss and flat-finish paints; or it can be added to other preformed latex paints such as the styrene-butadiene-, acrylic- or vinyl latex paints to improve their adhesion properties.

Example XXXVII

To 150 parts of dry dioxane containing 40 parts of isoprene, 10 parts of ethyl acrylate and 5 parts of

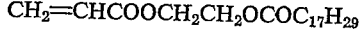

and cooled to −30° C. is added 0.3 part of BuLi as a 50% solution in ethyl ether. The mixture is maintained at this temperature for 16 hours. Then the mixture is allowed to heat up to room temperature, following which it is neutralized with acetic acid. The dioxane is removed by evaporation at 15 mm. pressure, 120 parts of toluene are added and the resulting polymer solution is filtered.

When metallic driers are added to this solution, and films prepared therefrom, more rapid drying occurs than in a corresponding polymer which contains no linolenyl acrylate in its composition. These metallic driers are described above as the cobalt, manganese and lead salts of carboxylic acids, preferably those containing no more than 30 carbon atoms.

Example XXXVIII

Example I is repeated using 620 parts of glyceryl dioleate instead of 324 parts of hydroxyethyl linoleate, and the acrylic monomer,

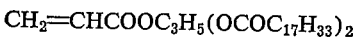

isolated by evaporation of the dry ether solution after treatment with activated carbon. An 80–20 copolymer with ethyl acrylate is prepared using the procedure of Example X and when the polymers were mixed with driers according to the procedure of Example XVIII, dried, elastic, tough films are obtained in six to seven hours.

The invention claimed is:

1. An air-drying polymer substantially completely soluble in a solvent selected from the class consisting of butane, propane, hexane, heptane, octane, cyclohexane, benzene, toluene, xylene, dimethyl ether, diethyl ether, dibutyl ether, tetrahydrofurane, dioxane, diphenyl ether, dibenzyl ether, dimethyl ethylene glycol ether, dibutyl ethylene glycol ether and diethyl-diethylene glycol ether, having a plurality of repeating units in the linear chain thereof of the formula

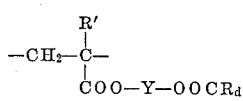

wherein R' is a radical selected from the class consisting of hydrogen and methyl radicals;

$R_d$ is an unsaturated aliphatic radical containing no less than 15 and no more than 24 carbon atoms and consisting of a terminal —$CH_3$ group, at least 1 and no more than 4 —CH=CH— groups, and the remainder consisting of —$CH_2$— groups; and Y is a polyvalent hydrocarbon radical of no more than 20 carbon atoms having a valency of at least 2 and no more than 6, the valencies in excess of those shown in said above formula being occupied by groups selected from the class consisting of $R_d$COO—, HO—, RO— and RCOO— groups in which R is a hydrocarbon radical of no more than 24 carbon atoms said polymer being prepared by anionic polymerization.

2. A polymer of claim 1, in which said repeating unit has the formula $$-CH_2CH- \\ |\\ COOCH_2CH_2OOCC_{17}H_{33}$$

3. A polymer of claim 1, in which said repeating unit has the formula

4. A polymer of claim 1, in which said repeating unit has the formula

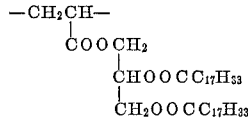

in which the —$OOCR_d$ radical is the linoleic acid radical.

5. A polymer of claim 1, in which said repeating unit has the formula

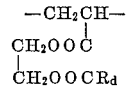

in which the —$OOCR_d$ radical is the linoleic acid radical.

6. A polymer of claim 1, in which said repeating unit has the formula

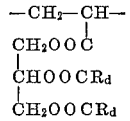

in which the —$OOCR_d$ radical is the linoleic acid radical.

7. A polymer of claim 1, in which said repeating unit has the formula

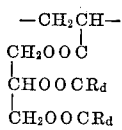

in which the —$OOCR_d$ radical is the linoleic acid radical.

8. A polymer of claim 1 which also has in the linear polymer chain a plurality of repeating units of the formula

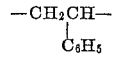

9. A polymer of claim 1 which also has in the linear polymer chain a plurality of repeating units of the formula

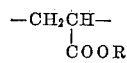

10. A polymer of claim 1 which also has in the linear polymer chain a plurality of repeating units of the formula

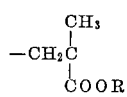

11. The process of preparing a linear polymer comprising the step of polymerizing a monomer of the formula

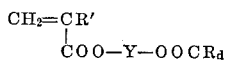

wherein

R' is a radical selected from the class consisting of hydrogen and methyl radicals;

$R_d$ is an unsaturated aliphatic radical containing no less than 15 or no more than 24 carbon atoms and consisting of a terminal —$CH_3$ group, at least 1 and no more than 4 —CH=CH— groups, and the remainder consisting of —$CH_2$— groups; and Y is a polyvalent hydrocarbon radical of no more than 20 carbon atoms having a valency of at least 2 and no more than 6, the valencies in excess of those shown in said above formula being occupied by groups selected from the class consisting of $R_d$COO—, HO—, RO—, and RCOO— groups in which R is a hydrocarbon radical of no more than 24 carbon atoms;

said polymerization being effected in the presence of an anionic initiator and at a temperature in the range of about —80° to 80° C.

12. The process of claim 11, in which said monomer has the formula:

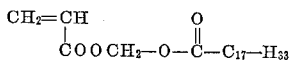

13. The process of claim 11, in which said monomer has the formula:

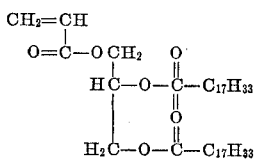

14. The process of claim 11, in which said monomer has the formula

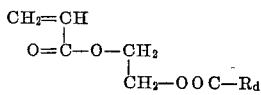

in which the —$OOCR_d$ radical is the linoleic acid radical.

15. The process of claim 11, in which said monomer has the formula

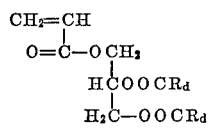

in which the —OOCR$_d$ radical is the linoleic acid radical.

16. The process of claim 11, in which said monomer has the formula

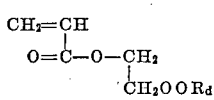

in which the —OOCR$_d$ radical is the linoleic acid radical.

17. The process of claim 11, in which said initiator is sodium.

18. The process of claim 11, in which said initiator is butyl lithium.

19. The process of claim 11, in which said initiator is a combination of sodium and liquid ammonia.

20. A polymeric composition comprising a polymer of claim 1 and a minor amount of a metallic drier selected from the class consisting of cobalt, lead and manganese salts of carboxylic acids containing no more than 30 carbon atoms.

References Cited by the Examiner

UNITED STATES PATENTS

| 2,160,532 | 5/1939 | Barrett et al. | 260—410.8 |
| 2,593,444 | 4/1952 | Harrison | 260—89.5 |

FOREIGN PATENTS

| 836,736 | 6/1960 | Great Britain. |
| 1,105,172 | 4/1961 | Germany. |

LEON J. BERCOVITZ, *Primary Examiner.*

C. W. IVY, R. W. GRIFFIN, *Assistant Examiners.*